United States Patent Office 3,137,729
Patented June 16, 1964

3,137,729
PRODUCTS FROM THE REACTION OF ALKYNES
AND SECONDARY AMINES
Carl W. Kruse and Roger F. Kleinschmidt, Bartlesville, Okla., assignors to Phillips Petroleum Company, a corporation of Delaware
No Drawing. Filed Aug. 12, 1960, Ser. No. 49,131
4 Claims. (Cl. 260—583)

This invention relates to novel amine compounds, to catalytic processes for producing same, and to a method of removing catalyst from the reaction product. Another aspect of the invention concerns the hydrogenation of said compounds.

In that phase of acetylene chemistry commonly referred to as Reppe Chemistry, various reactions of acetylene and amines have been carried out. One reaction which has been studied is the reaction of acetylene with secondary amines in the presence of either cuprous acetylide or cuprous chloride. Two moles of acetylene react with a secondary amine to produce a substituted amino-1-butyne. However, these compounds contain a terminal triple bond, and under certain conditions would be expected to react with additional secondary amine and/or acetylene to produce more complex products.

Furthermore, it has also been reported that although secondary amines absorbed acetylene in the presence of basic compounds such as NaOH or in the presence of cadmium and zinc salts, unidentifiable resin-like products were formed.

We have found that alkynes higher than acetylene react with secondary amines to form new acetylenic amines. Since reduction of these new amine-acetylene reaction products would provide a method for the preparation of various amines, it was attempted to hydrogenate these materials in the presence of the usual hydrogenation catalyst. However, it was found that hydrogenation in the presence of the residual zinc and/or cadmium reaction catalyst did not proceed.

Accordingly, an object of this invention is to provide a method for catalytically reacting secondary amines and alkynes higher than acetylene. It is a further object of this invention to produce novel amines containing a nonterminal acetylenic group. Another object is to provide a method for removing catalyst from the reaction product. Other objects will become apparent upon consideration of the accompanying disclosure.

We have now discovered that novel tertiary amines containing internal acetylenic bonds can be prepared by a process which comprises contacting a secondary amine selected from the group consisting of

and

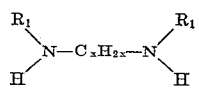

wherein each $R_1$ is selected from the group consisting of alkyl radicals containing from 1 to 6 carbon atoms and cycloalkyl radicals containing from 5 to 6 carbon atoms; wherein the 2 $R_1$'s of the monoamine can together with the nitrogen form a saturated heterocyclic ring containing from 5 to 6 ring atoms, said ring atoms other than the nitrogen being selected from the group consisting of carbon and oxygen, with at least three of said ring atoms being carbon; and wherein $x$ is an integer of from 2 to 8, with an alkyne of the formula $R_2$—C≡C—H wherein $R_2$ is selected from the group consisting of alkyl, aralkyl, alkaralkyl, cycloalkyl, alkylcycloalkyl, polycycloalkyl, alkylpolycycloalkyl radicals containing from 1 to 10 carbon atoms and —$CH_2$—O—$R_3$, wherein $R_3$ is a 1–10 carbon alkyl, in the presence of a catalyst selected from the group consisting of zinc and cadmium salts of selected organic acids, cuprous chloride and cuprous bromide. The terminology "polycycloalkyl" is intended to include monovalent radicals from saturated bicyclo or tricyclo bridged hydrocarbon ring systems.

Some examples of amines which can be employed in the process of this invention are: dimethylamine, diethylamine, diisopropylamine, di-n-butylamine, di-n-pentylamine, di-tert-hexylamine, ethylmethylamine, piperidine, pyrrolidine, morpholine, N,N'-dimethylethylenediamine, N,N' - diethylpropane-1,3-diamine, N,N'-di-n-propylbutane-1,4-diamine, N,N' - dicyclohexyloctane-1,8-diamine, N-methyl-N'-n-hexylpentane-1,5-diamine and the like.

Some examples of alkynes which can be employed are methylacetylene (propyne), ethylacetylene, n-propylacetylene, n-butylacetylene, n-decylacetylene, benzylacetylene, cumylacetylene, phenylethylacetylene, 3-phenylbutylacetylene, 4-methylbenzylacetylene, 3 - ethylphenylethylacetylene, 4-n-propylbenzylacetylene, cyclohexylacetylene, cyclopentylacetylene, 3 - methylcyclohexylacetylene, 4-n-butylcyclohexylacetylene, camphylacetylene, 2-pinylacetylene, methoxymethylacetylene, ethoxymethylacetylene and n-decoxymethylacetylene. The preferred alkynes are those of the above general formula wherein $R_2$ is an alkyl radical, and the most desirable groups are those where $R_2$ is a 1–6 carbon alkyl.

The zinc and cadmium salts of acetic, propionic, butyric, benzoic and naphthenic acids are applicable as catalysts in the process of this invention. The preferred catalyst is a mixture of zinc and cadmium acetates. These salts are employed as anhydrous salts, and are conveniently prepared by blending, for example, a 50/50 mixture of zinc acetate dihydrate and cadmium acetate dihydrate and then dehydrating the mixture at an elevated temperature.

The contacting of one of the amines with one of the alkynes in the presence of the above-defined salts is carried out at a temperature in the range of 100–200° C., preferably between 120 and 150° C. The pressure of the reaction is not critical, and depends upon the temperature, the vapor pressure of the reactants, or the alkyne charge rate if a normally gaseous alkyne, such as propyne (methylacetylene), is being employed. The reaction is usually carried out at a pressure between 50 and 500 p.s.i.g. The reaction time depends upon the temperature being employed, but is usually in the range of .1 to 48 hours.

It is desirable to supply at least two moles of alkyne per amino nitrogen present, and it is preferred to utilize an excess over and above this amount, as for example 2.5–3.0 moles of alkyne/amino nitrogen. Thus if a monoamine is employed, at least two moles of alkyne per mole of amine should be used, and if a diamine is employed, a minimum of four moles of alkyne per mole of amine should be used. The foregoing assumes that a maximum yield based upon the amine is desired; but the reactant can be supplied in any proportions to effect the reaction, such as 0.1 to 10 moles of alkyne per mole of amine.

The amount of catalyst employed is not critical, although the amount usually employed is within the range of 0.0065 to 0.05 mole per mole of amine present.

The following equation illustrates the method by which the novel tertiary amines containing an internal acetylenic linkage are formed:

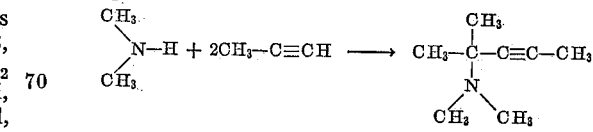

While the compounds of this invention can be prepared by the use of such catalysts as cuprous chloride, much higher yields are obtained by the use of the above-defined zinc and cadmium salts. This is particularly surprising in view of the disclosures of the prior art which state that the reaction of secondary amines with acetylene in the presence of these salts produces resinous, non-distillable materials.

The products of this invention can be named as either amino-substituted alkynes or as alkynylamines. The compounds prepared by the process of this invention are represented by the formulas:

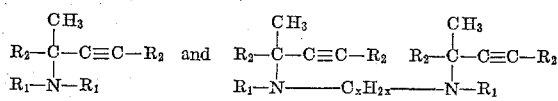

wherein $R_1$, $R_2$, and $x$ are as previously defined. Some examples of compounds prepared by the process of this invention and falling within the scope of these formulas are: 2 - dimethylamino - 2 - methyl-3-pentyne, 3-diethylamino - 3 - methyl-4-heptyne, 7-di-n-hexylamino-7-methyl-8-pentadecyne, 2-di-n-butylamino-2-methyl-3-pentyne, 2-dicyclohexylamino - 2 - methyl-3-pentyne, 4-dicyclopentylamino - 4 - methyl-5-nonyne, 3-(1-piperidyl)-3-methyl-4-heptyne, 2-(4-morpholyl)-2-methyl-3-pentyne, 5-(ethylmorpholyl)-5-methyl-6-undecyne, N,N'-dimethyl-N,N'-di-(2 - [2 - methyl-3-pentynyl])ethylenediamine, N,N'-di-n-hexyl - N,N' - di(5 - [methyl-6-undecynyl])-octane-1,8-diamine, and 5-diethylamino-5-methyl-3,9-dioxaundecyne-6.

The compounds which are prepared by the process of this invention can be used, for example, as intermediates in the manufacture of rocket fuels, monopropellants, and the like. The reaction of these compounds with hydrogen under selected conditions is the subject matter of our copending application S.N. 49,129, filed August 12, 1960.

The following specific examples are intended to illustrate the advantages of this invention, but it is not intended that the invention be limited to particular embodiments shown therein.

*Example I*

A run was carried out in which dimethylamine was reacted with propyne in the presence of a mixture of zinc and cadmium acetates.

In this run, the mixture of zinc and cadmium acetates was prepared by dehydration of a mixture containing equal weights of cadmium acetate dihydrate and zinc acetate dihydrate. A mixture of 175 grams (3.9 moles) of dimethylamine, 170 grams (4.25 moles) propyne and 8.5 grams of the zinc and cadmium acetates mixture were charged to a one-liter stainless steel autoclave. The mixture was stirred for 17 hours at 120° C., during which time the pressure decreased from an initial value of 550 p.s.i.g. to 160 p.s.i.g. The reaction mixture was then cooled to 10° C., and 168 grams (4.2 moles) of propyne was added, and the temperature was again raised to 120° C. The pressure reached 350 p.s.i.g. and then dropped to 75 p.s.i.g. after 22 hours. After cooling the reaction mixture to room temperature, 2.7 liters (0.1 mole) of propyne was vented to the atmosphere through a wet test meter. The reaction product, a clear yellow, oil was diluted with approximately 300 ml. of ether and then shaken vigorously with four 100 ml. portions of 5 percent aqueous sodium carbonate. The aqueous slurry which formed after each treatment was removed and the last carbonate treatment was followed by a water wash. The ethereal solution was dried, and the ether was removed on a steam bath leaving 449 grams of product. By rapid distillation through a Vigreux column, 348 grams of a product which boiled at 90–95° C. at 170 mm. mercury absolute pressure was obtained. This represents a yield of 2-dimethylamino-2-methyl-3-pentyne of 68.7% of theoretical, based on the amine.

A small, narrow boiling sample of this material was obtained by fractionation of a heart cut. This sample boiled at 67.5° C. at 60 mm. mercury absolute pressure and had a refractive index $n_D^{20}$ of 1.4439. As shown by the following tests, this compound is 2-dimethylamino-2-methyl-3-pentyne ($C_8H_{15}N$). The calculated carbon content for this compound is 76.74 weight percent, and the calculated hydrogen content is 12.08 weight percent. The values obtained by elemental analysis in two separate analyses were C, 76.90, 76.65; and H, 12.05, 12.00. The picrate of this compound had a decomposition point of 255° C. The mass spectrum for this compound showed a parent peak at 125 mass units. The infrared spectrum indicated an internal triple bond by a band at 4.5 microns. These data, together with the unequivocal synthesis shown in Example III, establish conclusively that the compound obtained was 2-dimethylamino-2-methyl-3-pentyne, which can also be named as N,N,1,1-tetramethyl-2-butynylamine.

*Example II*

A run was carried out in which the product prepared in Example I was prepared by the use of cuprous chloride as the catalyst.

This run, using the equipment of Example I, was carried out in the following manner. A mixture of 46 grams (1.02 moles) of dimethylamine, 82 grams (2.05 moles) of propyne and 5 grams of cuprous chloride were charged to the autoclave and heated from 10° C. to 89° C. over a 30 minute period. The pressure increased from 20 to 310 p.s.i.g. At this point, an exothermic reaction took place, and the external heating was discontinued. The pressure rose rapidly to 530 p.s.i.g. as the temperature increased spontaneously to 130° C. The pressure dropped rapidly, but the temperature remained near 130° C. for several minutes even though the reactor was being cooled with a stream of air. After one hour, the temperature was 103° C., and the pressure was 100 p.s.i.g. When the temperature was decreased to 17° C., there was less than 5 p.s.i.g. pressure on the autoclave. The catalyst was removed by filtration, and the product obtained was distilled rapidly through a Vigreux column. The yield of 2-dimethylamino-2-methyl-3-pentyne, boiling point 78° C. at 90 mm. mercury absolute pressure and a refractive index at 20° C. of 1.4440, was 51 grams or 40 percent theoretical, based on the amine.

*Example III*

As further proof of the structure of the product prepared in Example I, an additional sample of 2-dimethylamino-2-methyl-3-pentyne was prepared by the methylation of 2-dimethylamino-2-methyl-3-butyne.

In this run, a solution of 27.6 grams (0.25 mole) of 2-dimethylamino-2-methyl-3-butyne in 250 ml. diethyl ether was reacted with 0.25 mole of methyl iodide in ammonia containing one-quarter of a mole of metallic sodium. The reaction mixture was stirred for 30 minutes at the temperature of refluxing ammonia. The flask was warmed gently and the ammonia was allowed to escape. When the temperature of the reaction mixture reached 20° C., ice and water were added. The ethereal solution was then removed and dried over potassium carbonate. The dry solution was then subjected to distillation, and 13.7 grams, representing a 44 percent thoeretical yield, of 2-dimethylamino-2-methyl-3-pentyne, boiling point 68° C. at 62 mm. mercury absolute pressure was recovered. The refractive index of this material at 20° C. was 1.4432. Comparison of the infrared spectrum of this material with the infrared spectrum of the material prepared in Example I showed them to be the same compound.

*Example IV*

In still another run, 2-diethylamino-2-methyl-3-pentyne was prepared by the reaction of propyne and diethylamine in the presence of mixed zinc and cadmium acetates.

In this run, 73.0 grams (1 mole) of diethylamine, 66.0 grams (1.65 moles) of propyne and 4 grams of the mixed zinc and cadmium acetates of Example I were heated together with stirring at 120° C. for 7 hours. This resulted in a pressure decrease from 325 to 195 p.s.i.g. The reactor was then cooled to 5° C. and 67.1 grams (1.68 moles) of additional propyne was added. The temperature was raised to 120° C. for 15 hours, at which time the pressure had dropped from 390 p.s.i.g. to 215 p.s.i.g. The temperature was then raised to 130° C. for one hour and then to 140° C. for 1½ hours. There was no indication of any additional reaction at these high temperatures. The reactor was cooled to 32° C., and 29.5 grams of propyne was removed into a trap cooled with Dry Ice. The product was a light brown, clear liquid.

This product was then diluted with 250 ml. of ether, and the ethereal solution was shaken with five 100-ml. portions of 5 percent aqueous sodium carbonate. This treatment was followed by washing with water. After drying, the ethereal solution over calcium sulfate, the ether was removed at atmospheric pressure until the pot temperature reached 117° C. The weight of product obtained was 149.2 grams. A distillation of this material yielded 123 grams of 2-diethylamino-2-methyl-3-pentyne.

A portion of the same amine which was prepared in a similar manner in another experiment was carefully distilled to obtain a sample which had a boiling point of 60° C. at 9 mm. mercury absolute pressure and a refractive index $n_D^{20}$ of 1.4470. The calculated molecular weight for this compound is 153, and the mass spectrum of this material showed a parent peak at 153. The infrared spectrum of this compound indicated the presence of an internal triple bond by a band at 4.45 microns. The elemental analysis was:

Calculated for $C_{10}H_{19}N$: C, 78.5; H, 12.4. Found by analysis: C, 78.4; H, 12.3.

The picrate had a decomposition point of 117–118° C.

We have now discovered that cuprous chloride and/or bromide and zinc and/or cadmium salts, such as the acetates, can be removed from amine-acetylene reaction mixtures by a process which comprises contacting said catalyst-containing mixture with an aqueous solution of a compound selected from the group consisting of water soluble metal carbonates and hydroxides.

Any water soluble inorganic carbonate or hydroxide can be employed in the process of this invention, but it is preferred to use alkali metal carbonates or hydroxides, the preferred of which are sodium and potassium carbonates or hydroxides. The amount of inorganic carbonate or hydroxide which is employed should be at least one mole per mole of catalyst salt present. Preferably, an excess of carbonate is employed, as for example, from 2:1 to 10:1 moles of inorganic carbonate per mole of catalyst salt present. The precipitates formed are the carbonates and hydroxides of the metals of the catalyst.

The amine-acetylene reaction mixture which contains the zinc, cadmium, and/or cuprous salts as residual catalyst is contacted with an aqueous solution of one of the above-defined carbonates or hydroxides. The aqueous solution will generally contain from 2 to 20 percent by weight of the carbonate or hydroxide. The exact concentration will depend in part on the temperature and the particular treating agent used. The temperature at which this contacting is carried out is usually within the range of 0 to 30° C. Higher temperatures can, of course, be employed, but are usually not desirable.

The treatment of the reaction mixture with the above-defined carbonates or hydroxides causes the formation of an insoluble precipitate. The insoluble precipitate can be removed by such means as filtration, centrifugation, decantation and the like.

While the above-described process for removing zinc, cadmium, and/or cuprous salts is particularly adapted to the removal of these materials from amine-acetylene reaction mixtures, it is also applicable to the removal of these materials from other reaction mixtures which employ such salts as reaction catalysts.

Following the removal of these salts from the amine-alkyne reaction mixtures, these crude mixtures, without prior distillation or other purification, then absorb hydrogen rapidly and smoothly under usual hydrogenating conditions. In the case of the reaction product of alkyne and secondary amines, the dialkylamino alkynes undergo both hydrogenation and hydrogenolysis yielding a variety of products, dependent upon the hydrogenation conditions employed.

In carrying out such hydrogenations, the well-known hydrogenation catalysts such as platinum, platinum on charcoal, palladium on calcium carbonate and the like can be employed. (This invention is the subject matter of our above-identified application.) In any event, the removal of the zinc, copper and cadmium salts by the process of this invention prevents poisoning of such hydrogenation catalysts by these materials.

*Example V*

A run was carried out in which a reaction mixture containing an amine-alkyne reaction product was treated with hydrogen in the presence of, and subsequently in the absence of, a mixture of zinc and cadmium acetates.

In this run, 114 grams of di-n-butyl amine and 4.0 grams of a 50/50 mixture of anhydrous zinc and cadmium acetates were charged to a 1-liter reactor fitted with a magnetic stirrer. The reactor was then closed and pressured to 75 p.s.i.g. with methylacetylene. The stirrer was then turned on, and the pressure dropped gradually until 45 p.s.i.g. was reached, at which time additional methylacetylene was charged to again raise the pressure to 75 p.s.i.g. The reactor was closed and then the contents were heated with stirring until the temperature reached 120° C. and sufficient heat was supplied to maintain this temperature. Since methylacetylene was being consumed by the reaction, the pressure was constantly decreasing, so from time to time, additional methylacetylene was pressured in. The total reaction time was 6½ hours, while the total time after reaching 120° C. was 4 hours and 50 minutes. The maximum pressure during this period was 310 p.s.i.g., and the minimum pressure was 80 p.s.i.g.

After cooling and venting the reactor contained 152 grams of a wine-colored liquid product, $n_D^{20}$ 1.4275. The major portion of this product was 2-di-n-butylamino-2-methyl-3-pentyne. Portions of this material were used in the following hydrogenation experiments.

The more volatile components of a 58 gram sample of the crude reaction effluent were removed by evaporation at room temperature in a 500-ml. round-bottomed flask attached to a rotary evaporator maintained at 3–5 mm. mercury absolute. After 6–7 hours there remained 45 grams liquid which was then transferred to the bottle of a Parr hydrogenator.

Hydrogen and a small amount of platinum hydrogenation catalyst was charged, and the temperature was maintained at 27° C. and 54 p.s.i.g. for 5 hours and 44 minutes. No hydrogen was absorbed. A small amount of 0.125 weight percent platinum on charcoal was then added, and hydrogenation at 54 p.s.i.g. and 30° C. for 2 hours again showed no absorption of hydrogen. At this time, a small amount of 5 percent palladium on calcium carbonate was added, and hydrogenation for 3 hours and 35 minutes at 56 p.s.i.g. and 29° C. did not result in any absorption of hydrogen. The contents of the hydrogenator were filtered free of hydrogenation catalysts and treated with several portions of 5 percent aqueous sodium carbonate. Some precipitate was formed and removed by filtration through glass wool. The organic layer was returned to the hydrogenator (without drying), platinum catalyst was added and the mixture shaken with hydrogen at 30° C. and 55 p.s.i.g. Hydrogen was rapidly absorbed.

The acetylenic amines made by the process of the invention are converted to the corresponding amine oxides by contacting the acetylenic amines in solution in a suitable solvent with a peroxygen compound selected from the group consisting of hydrogen peroxide and organic peracids and peresters. Some specific examples of organic peroxygen compounds are peracetic acid, perpropionic acid, perbenzoic acid, perphthalic acid and the like. The acetylenic amines are first dissolved in a solvent and thereafter contacted with the selected peroxygen compound. Generally, if hydrogen peroxide is employed, an aqueous solution containing from 10 to 50% $H_2O_2$ is charged. Suitable solvents for the reaction include chloroform, ethyl acetate, alcohols, such as methanol and ethanol, and the like.

In forming the amine oxides by contacting the acetylenic amines with one of the above peroxygen compounds, a temperature below the boiling point of either the peroxygen compound or the acetylenic amine is employed. Such temperatures are generally below 100° C., and it is preferred to use a temperature between 0° C. and 50° C. for the formation of the amine oxides. The amount of peroxygen compound employed should be at least one mole of peroxygen per mole of amine, preferably 2 to 3 moles of peroxygen per mole of amine.

If an excess of a peroxygen compound is employed, it is desirable to decompose the remaining peroxygen compound prior to pyrolysis of the amine oxides. For example, if hydrogen peroxide is employed, decomposition of the excess peroxide can be obtained by contacting the solution with such agents as the platinum group metals and their oxides, silver, mercury and manganese and its oxides. Complete removal of the hydrogen peroxide can be determined by testing the solution with lead sulfide paper or some equivalent material.

Two products result from pyrolysis of the oxides of the amines of the above formula. One product is dimethylhydroxylamine, and for every mole of hydroxylamine formed, one mole of the other product is formed. The other product is a hydrocarbon of the formula

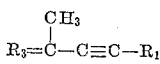

wherein $R_1$ is as previously defined and $R_3$ is selected from the group consisting of methylene and alkylidene, aralkylidene, alkylaralkylidene, cycloalkylidene, alkylcycloalkylidene, polycycloalkylidene, and alkylpolycycloalkylidene radicals containing from 2 to 9 carbon atoms and

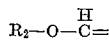

wherein $R_2$ is a 1 to 10 carbon alkyl.

The compounds are produced by the reaction of the acetylenic amines with a peroxygen compound are the oxides of the amines of the above formula. Some examples of compounds which are produced by the pyrolysis of the amine oxides are dimethylhydroxylamine, 2-methyl-1-penten-3-yne, 3-methyl-2-hepten-4-yne, 11-methyl-10-tricosen-12-yne, 1,5 - diphenyl-2-methyl-1-penten-3-yne, and 1-cyclohexyl-3-cyclohexylidene-1-butyne.

The pyrolysis of the amine oxide is carried out by heating the amine oxide, usually in a concentrated form of a solution in the solvent in which the treatment with peroxygen compound was carried out. Generally, the pyrolysis will be carried out at a temperature below the boiling point of the amine oxides, and the temperature will usually be within the range between 100 and 200° C. The pyrolysis can be carried out at atmospheric pressure, but in many cases it is advantageous to carry out the reaction at reduced pressure. The pyrolysis can be conveniently carried out in a distillation column using the heat in the pot of the distillation column to effect pyrolysis. As the pyrolysis proceeds, pyrolysis products can be taken overhead in the distillation column and worked up as product by known methods.

*Example VI*

A run was carried out in which N,N,1,1-tetramethyl-2-butynylamine-N-oxide was prepared and pyrolyzed according to the process of this invention.

In this run, a solution of 25 grams (0.2 mole) of N,N,1,1-tetramethyl-2-butynylamine in 60 ml. of methyl alcohol was charged to a 500 ml. flask fitted with a stirrer, a thermometer and a dropping funnel. To this solution was slowly added, while stirring, 60 grams (0.52 mole) of 30% aqueous hydrogen peroxide. The temperature during the addition was 0–10° C. A crystalline solid formed, but it dissolved or melted when the temperature reached approximately 25° C. The reaction mixture was then allowed to stand at room temperature for four days, at which time platinum black, prepared by the hydrogenation of 0.2 gram of platinum dioxide in methanol was added to the reaction mixture. A negative test for hydrogen peroxide was obtained the following day with lead sulfide paper. The methanol and water were then removed by evaporation at 30–40° C. The residue from this evaporation, containing the amine oxide, amounted to 30 grams.

One-half of the residue from the above evaporation was then transferred to a 200 ml. distillation flask which was connected to Vigreux column and 3 Dry Ice cooled traps in series. The pressure was reduced to 15 mm. mercury absolute pressure and the amine oxide was heated slowly to 140° C. with an oil bath, yielding approximately 6 ml. of distillate. The pressure was then reduced to 3 mm. mercury absolute pressure to remove the remaining volatile products. The more volatile product, which condensed in the Dry Ice cooled traps, was diluted with ether and dried over potassium carbonate. Six grams of n-heptane was added to this material, following which the solution was distilled. An infrared spectrum of a cut from this distillation, boiling 75–81° C. at 752 mm. mercury absolute pressure clearly showed the presence of 2-methyl-1-penten-3-yne. Gas chromatography of this cut also showed a peak coresponding to that of 2-methyl-penten-3-yne.

The other product from the pyrolysis of the amine oxide was dimethylhydroxylamine.

Certain modifications of the invention will become apparent to those skilled in the art and the illustrative details disclosed are not to be construed as imposing unnecessary limitations on the invention.

We claim:

1. As a compound member of the group represented by the formulas:

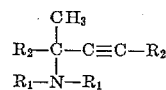

and

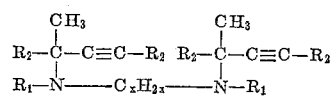

wherein each $R_1$ is a member of the group consisting of alkyl radicals containing from 1 to 6 carbon atoms and cycloalkyl radicals containing from 5 to 6 ring atoms, said ring atoms other than nitrogen being selected from the group consisting of C, and O, with at least 3 of said ring atoms being carbon; wherein $x$ is an integer from 2 to 8; and wherein $R_2$ is a member of the group consisting of alkyl, aralkyl, alkaralkyl, cycloalkyl, alkylcycloalkyl, and alkylpolycycloalkyl radicals containing from 1 to 10 carbon atoms and $—CH_2—O—R_3$, wherein $R_3$ is a 1–6 carbon alkyl.

2. As a compound, 2-dimethylamino-2-methyl-3-pentyne.

3. As a compound, 2 - di-n-butylamino - 2 - methyl-3-pentyne.

4. As a compound, 2-diethylamino-2-methyl-3-pentyne.

References Cited in the file of this patent

UNITED STATES PATENTS

| 2,273,141 | Reppe et al. | Feb. 17, 1942 |
| 2,613,208 | Van Hook et al. | Oct. 17, 1952 |

OTHER REFERENCES

Bergmann: "Acetylene Chemistry," pages 20–21 (1948).

Raphael: "Acetylenic Compounds in Organic Synthesis," page 39 (1955).

Reppe: "Acetylene Chemistry," P.B. Report-18852-s, page 76 (1949).